US007197937B2

(12) United States Patent
Amore et al.

(10) Patent No.: US 7,197,937 B2
(45) Date of Patent: Apr. 3, 2007

(54) HERMETIC PRESSURE SENSING DEVICE

(75) Inventors: Alan G. Amore, Cumberland, RI (US);
Eric J. Giasson, Somerset, MA (US);
James I. Ogilvie, Cranston, RI (US);
Stephen P. Greene, Harmony, RI (US);
David J. Field, Attleboro, MA (US);
Andrew F. Willner, Attleboro, MA (US); Vanvisa Attaset, Randallstown, MD (US)

(73) Assignee: Sensata Technologies, Inc., Attleboro, MA (US)

( * ) Notice: Subject to any disclaimer, the term of this patent is extended or adjusted under 35 U.S.C. 154(b) by 0 days.

(21) Appl. No.: 11/333,637

(22) Filed: Jan. 17, 2006

(65) Prior Publication Data
US 2006/0162461 A1   Jul. 27, 2006

Related U.S. Application Data

(60) Provisional application No. 60/647,226, filed on Jan. 26, 2005.

(51) Int. Cl.
*G01L 7/08* (2006.01)
(52) U.S. Cl. .............................. 73/715; 73/718; 73/724
(58) Field of Classification Search ........... 73/700–756
See application file for complete search history.

(56) References Cited

U.S. PATENT DOCUMENTS 4,982,351 A   1/1991   Kawate et al.
6,209,398 B1 *  4/2001   Fowler et al. ................ 73/724
6,272,927 B1   8/2001   Amatruda et al.
6,453,747 B1   9/2002   Weise et al.
6,781,814 B1   8/2004   Greene

* cited by examiner

*Primary Examiner*—Edward Lefkowitz
*Assistant Examiner*—Jermaine Jenkins
(74) *Attorney, Agent, or Firm*—Russell E. Baumann

(57) ABSTRACT

A pressure sensing device (10, 40) is shown having a ceramic capacitive sensing element (12) received in a chamber formed in a hexport housing (16). The hexport housing has a fluid passageway (16*c*) communicating with a recessed chamber (16*d*) formed in a bottom wall circumscribed by an annular platform shoulder (16*e*). A thin flexible metal diaphragm (18) is hermetically attached to the bottom wall along the platform shoulder. A curable adhesive resin having a thermal coefficient of expansion and modulus of elasticity appropriately matching that of sensing element (12), such as polyurethane, is cast between the sensing element (12) and the metal diaphragm (18) forming, when cured, a layer bonded to both members resulting in a sensor that is effective in monitoring negative as well as positive fluid pressures. In one embodiment a ring is used to define layer 20 laterally and in a second embodiment an insulator sleeve (44) and shield sleeve (42) which receives pressure sensing element (12) each have an open end with an inwardly extending lip (44*b*, 42*b*) that define layer 20 laterally.

12 Claims, 4 Drawing Sheets

HERMETIC PRESSURE SENSING DEVICE

RELATED APPLICATIONS

Benefit is claimed under 35 U.S.C. Section 119(e) (1) of U.S. Provisional Application No. 60/647,226, filed Jan. 26, 2005.

FIELD OF THE INVENTION

This invention relates generally to condition responsive sensors and more particularly to fluid pressure responsive capacitive transducers.

BACKGROUND OF THE INVENTION

A known pressure sensor shown in U.S. Pat. No. 4,875,135, assigned to the assignee of the present invention, the subject matter of which is included herein by this reference, comprises a capacitive pressure transducer having a thin ceramic diaphragm mounted in closely spaced, sealed, overlying relation to a ceramic base. Metal coatings are deposited on respective opposing surfaces of the diaphragm and base to serve as capacitor plates arranged in predetermined closely spaced relation to each other to form a capacitor. Transducer terminals connected to the capacitor plates are arranged at an opposite surface of the transducer base and a signal conditioning electronic circuit connected to the transducer terminals is mounted on the transducer. A connector body of electrical insulating material is fitted over the electronic circuit and is secured to a metal housing having a cavity in which the transducer is received. The metal housing is formed with a port for connection to a fluid pressure source to be monitored and a flexible O-ring is seated in the metal housing around the port with the transducer biased against the O-ring to form a fluid seal and to define a fluid receiving recess with the diaphragm exposed to fluid in the recess. In that arrangement, the diaphragm is movable in response to variation in pressure applied to the diaphragm to vary the capacitance of the capacitor in accordance with the changes in applied pressure and the electrical circuit provides an electrical output signal corresponding to the applied pressure.

Although sensors of the type described have been very successful, there are certain fluids which are corrosive relative to elastomers used for the O-ring seals. By way of example, fluids having ammonia and automotive fluids having certain additives are incompatible with typical elastomers.

It is conventional to place a sensing element in a chamber and to seal the chamber with a flexible diaphragm with the chamber being filled with relatively incompressible oil to serve as a pressure transfer fluid. This approach could be used in sensing a condition of a fluid to be sensed, such as pressure, which fluid is corrosive to the sensing element. However, this represents a relatively expensive solution in manufacturing a suitable package requiring a number of processing steps including evacuation of a chamber and back filling with oil and providing a seal compatible with the pressure of the sensed fluids.

Another pressure sensor shown in U.S. Pat. No. 6,273,927, assigned to the assignee of the present invention, the subject matter of which is included herein by this reference, comprises a capacitive pressure transducer having a first surface to be exposed to an applied pressure to provide a capacitance value which varies with the fluid pressure applied, a housing having a transducer receiving cavity defined by a bottom wall and a sidewall extending upwardly from the bottom wall, the bottom wall formed with a fluid pressure receiving recess, a fluid pressure port formed in the housing in communication with the recess, a separate thin, flexible metal diaphragm secured to the bottom wall circumscribing the recess in fluid sealing relation therewith, the transducer received in the transducer receiving cavity with the first surface overlying the bottom wall and a thin layer of synthetic material disposed intermediate to the first surface of the capacitive pressure transducer and the metal diaphragm and in direct contact with both of them as a pressure transfer element.

The sensor is a hermetically sealed device in which the sensed media is sealed from the sensing element. It has been proven to be a successful sensor design, but in certain instances, especially in below atmospheric pressure applications, it can have accuracy issues and assembly of the device can require precise control.

SUMMARY OF THE INVENTION

It is an object of the invention to provide a hermetic pressure transducer which has high reliability in below atmospheric pressure range applications. Another object of the invention is the provision of a pressure transducer that is reliable and can be economically manufactured. Yet another object of the invention is the provision of a hermetic pressure sensing device having a capacitive sensing element in which the signal conditioning electronics of the capacitive sensing element are electrically isolated from the housing of the device.

Briefly stated, in accordance with the invention, a cylindrical capacitive pressure transducer has a metal hexport housing formed with a bottom wall formed with a recessed portion in fluid communication with a pressure port. A flexible thin metal diaphragm is hermetically attached to the bottom wall circumscribing the recessed portion and a cylindrical wall member extends upwardly to define a pressure sensing element receiving chamber. A curable, flexible, adhesive liquid resin is cast into a space formed between the metal diaphragm and the pressure sensing element with excess liquid resin expressed from a defined space between the components and allowed to cure in situ to form a flexible layer bonded to both the metal diaphragm and the pressure sensing element.

In a first preferred embodiment, a plastic ring having a selected thickness is used to define the space between the metal diaphragm and the pressure sensing element. The ring is formed with fluid passages extending between inside and outside diameters thereof. Crush tabs extend longitudinally in opposite directions from the ring body to center the ring when the pressure sensing element is inserted into the chamber and to space the ring slightly above the metal diaphragm at the initiation of a crimping procedure in order to augment fluid flow from the defined space until the lower crush tabs are crushed upon crimping of the free end of the housing wall member onto the base of a connector body with the remainder of the excess fluid flowing through the passages in the ring. The connector body is preferably formed with guide tabs for centering the pressure sensing element and an electronic circuit module mounted on the reverse side of the pressure sensing element from the pressure sensing side.

In a second preferred embodiment, a generally cylindrical Electro-Magnetic Compatibility (EMC) shield sleeve slidingly receives the pressure sensing element for seating against an inwardly extending annular lip at the inner end of the shield leaving an exposed pressure receiving face surface. Crimp tabs extend from the opposite end of the shield and are crimped over the pressure sensing element and onto electrically conductive contact pads of the electronic circuit module. A generally cylindrical insulator sleeve having a similar, generally coextensive annular lip at the inner end is inserted into the chamber of the housing. Liquid adhesive resin is dispensed into the opening in the shield formed by the lip and then the pressure sensing element with the EMC shield mounted thereon is inserted into the housing chamber. The insulator is formed with longitudinally extending passages spaced about the outer periphery of the insulator along the full length of the insulator and in fluid communication with respective radially extending notches in the inner free end of the insulator. As in the first embodiment, crush tabs extend longitudinally from the inner end of the insulator to initially space the insulator from the metal diaphragm by a slight amount until the crimping operation flattens the crush tabs when the free end of the housing wall member is crimped over the connector base bringing together and securing the several components.

BRIEF DESCRIPTION OF THE DRAWINGS

Other objects, advantages and details of the novel and improved fluid pressure sensing device of the invention appear in the following detailed description of preferred embodiments, the detailed description of which refer to the drawings in which:

FIG. 6(*a*) is a broken away, enlarged portion of FIG. 6 showing a portion of the FIG. 7 shield crimped onto a contact tab of the electronics mounted on the capacitor sensing element;

DETAILED DESCRIPTION OF PREFERRED EMBODIMENTS

Figure 1:
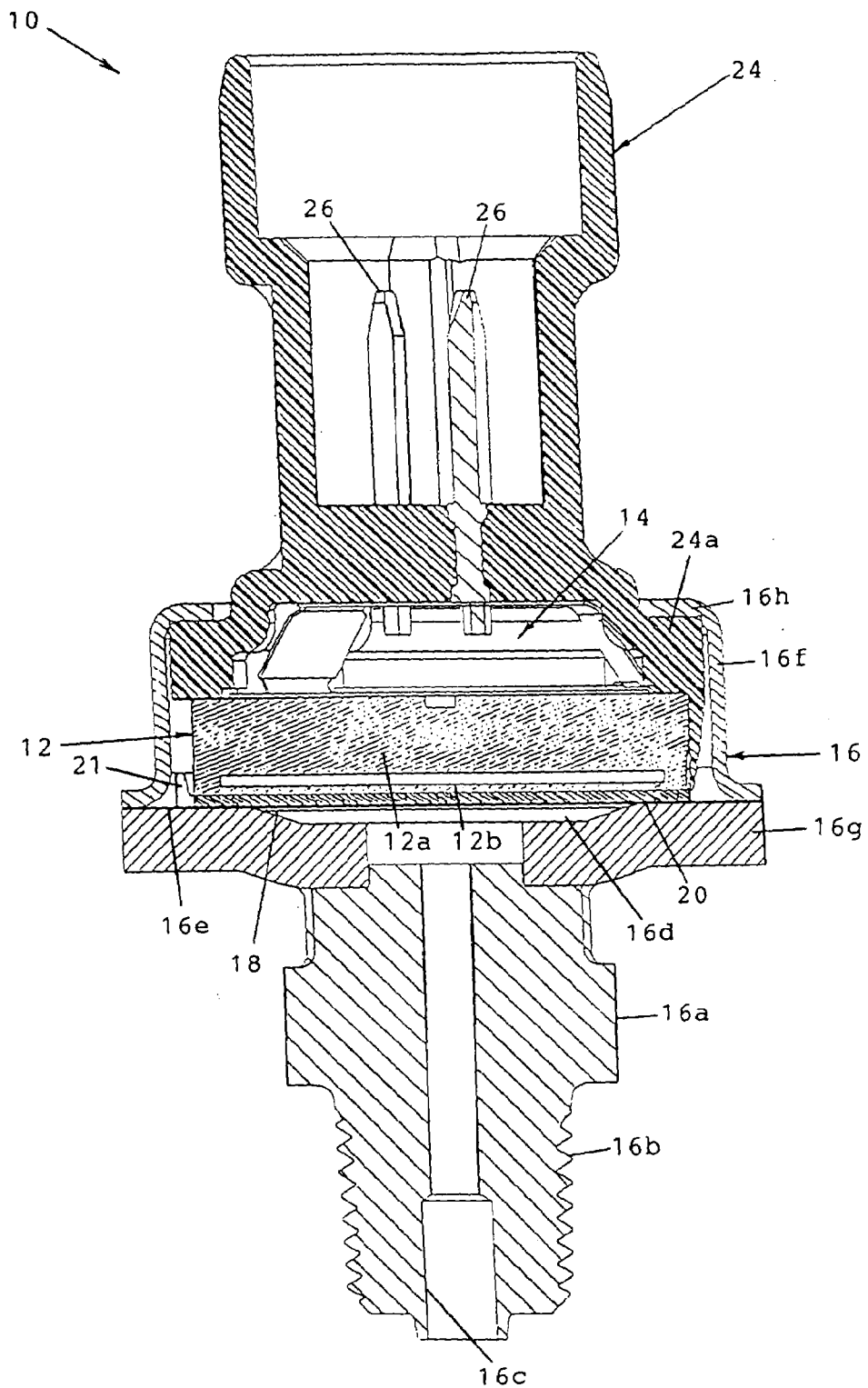
FIG. 1 shows an elevational view, in cross section, of a hermetically sealed pressure sensing device made in accordance with a first preferred embodiment of the present invention.

Referring to FIGS. 1 through 4, numeral 10 indicates an improved sensing device made in accordance with a first preferred embodiment of the invention which is shown to comprise a capacitive pressure sensing element or transducer 12 which includes a ceramic base 12*a* formed of alumina or the like and diaphragm 12*b* of like material which is mounted on the base in closely spaced, sealed overlying relation thereto. Thin metal coatings (not shown) are disposed on opposing inner surfaces of the base and diaphragm which serve as capacitive plates. Electrical leads extend from the coatings up through the base in a known manner for attachment to conditioning electronics 14 to be discussed. Pressure sensing element 12 is received in a chamber formed in a hexport housing 16 formed of suitable material such as stainless steel. Hexport housing 16 has a base portion preferably formed with hexagonally disposed, longitudinally extending flat surfaces 16*a* to facilitate installation using threaded coupling portion 16*b*. A fluid receiving passageway 16*c* extends through coupling portion 16*b* to a recessed lower chamber 16*d* in a bottom wall 16*g* formed with a circumferentially extending annular platform shoulder 16*e*. In accordance with the invention, a thin, flexible metal diaphragm 18 formed of suitable metal such as stainless steel is placed on platform 16*e* and hermetically attached thereto as by welding, brazing or the like. For reasons to be discussed below, an intermediate layer 20 of plastic adhesive material 19, preferably somewhat resilient, such as elastomeric, and a ring member 21, is placed between diaphragm 12*b* and diaphragm 18.

Hexport housing 16 is formed with a generally cylindrical sidewall 16*f*. Sidewall 16*f* may be attenuated at 16*h* to facilitate crimping attachment to a connector 24. Connector 24 is formed of suitable electrically insulative material and has a base formed with an annular shoulder portion 24*a* and with a recess which receives conventional signal conditioning electronics 14 such as the electronics noted above and disclosed in U.S. Pat. No. 4,875,135, referenced supra. Connector 24 mounts transducer terminals 26, two of which are shown in FIG. 1, for attachment to conditioning electronics 14. The attenuated wall portion 16*h* is crimped over the outer peripheral shoulder portion 24*a* of the connector to complete the assembly of the sensor device as will be explained in greater detail below.

The hermetic seal provided by metal diaphragm 18 eliminates the conventional O-ring with the concomitant problem of compatibility with some sensed fluids. Metal diaphragm 18 is designed to be relatively thin in gauge and therefore reasonably compliant so as to make direct contact with the sensing element when subjected to a fluid pressure to be measured. However, such a design can result in unacceptable levels of hysteresis and error without the intermediate layer 20.

In accordance with a preferred embodiment of the invention, intermediate layer 20 is made of ring member 21 positioned so as to rest on top of metal diaphragm 18. Ring member 21 is preferably made of plastic having a wall height "t" typically about 0.020 of an inch (see FIG. 3) with cut-out notches 21*b* formed therethrough from inside to outside diameters preferably about one half of wall height "t". Tab members 21*a* extend longitudinally in opposite directions with the tab members extending away from the metal diaphragm serving to properly position sensing element 12 during assembly of the sensor device and crimping operation.

An adhesive material 19 in liquid form is placed on top of diaphragm 18 and into the space defined by ring member 21 during assembly of device 10 so that after the crimping operation that holds all the parts together, the adhesive material will fill the space within the ring member and cure in situ to form a solid material layer with ring member 21 of a thickness generally equal to "t". Excess adhesive material will flow during crimping trough notches 21*b* in the ring member to open space areas outside the ring member. Upon completion of curing, the ring and cured adhesive material form intermediate layer 20 with the preselected height "t". Adhesive material 19 is preferably an elastomer material with a thermal coefficient of expansion and modulus of elasticity appropriately selected to work with and/or matching sensing element 12 such as a polyurethane or the like, for example, STYCAST (a trademark of Emerson & Cuming) U 2516 HTR, a flexible, filled polyurethane casting resin. The intermediate layer of the selected height, bonded to metal diaphragm 18 and to the sensing element minimize any hysteresis effects and measuring errors of prior art devices, especially for below atmospheric applications.

Figure 3:
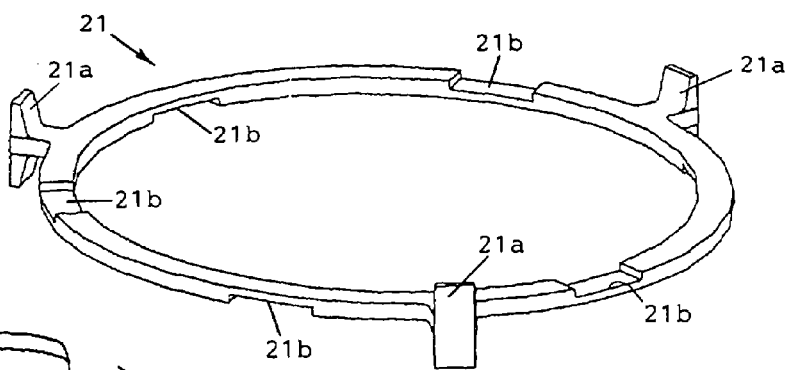
FIG. 3 is an enlarged perspective view of a ring member shown in FIG. 2.
Figure 2:
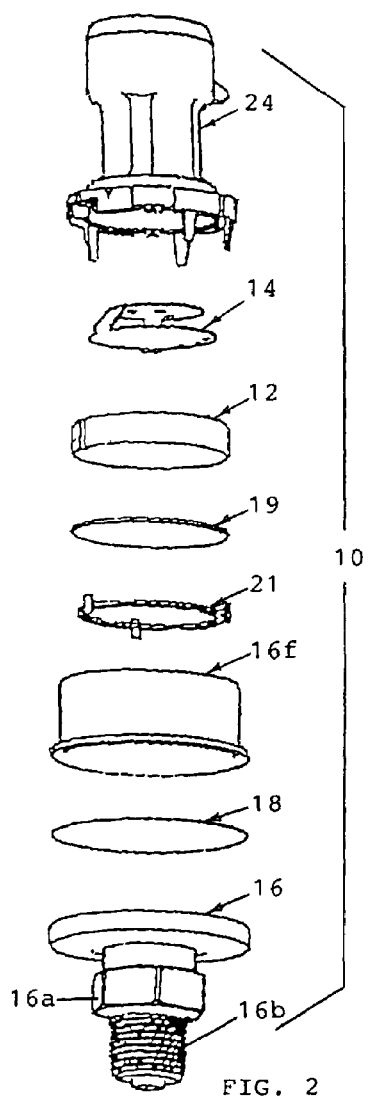
FIG. 2 is a simplified exploded perspective view of FIG. 1.

As noted above, tab members 21a of ring member 21 desirably extend in opposite longitudinal directions from the ring member with the set facing the metal diaphragm serving as transitional spacing crush members. That is, the members space the ring member slightly above the metal diaphragm prior to crimping and allow the greater part of the excess liquid to flow out of the space defined by the inner diameter of the ring member at the initiation of the crimping operation and are then crushed allowing the body of the ring member to engage the metal diaphragm with the remaining excess liquid being expressed out of the space defined by the ring member through notches 21b, as described above. Thus due to the identical construction of tabs 21a with respect to opposite longitudinal directions and the placement of notches 21b on opposite longitudinal sides of the ring member, as shown in FIG. 3. The ring member can be inserted into the chamber formed by side wall 16f in either of two opposite orientations thereby simplifying assembly of the device.

Figure 4:
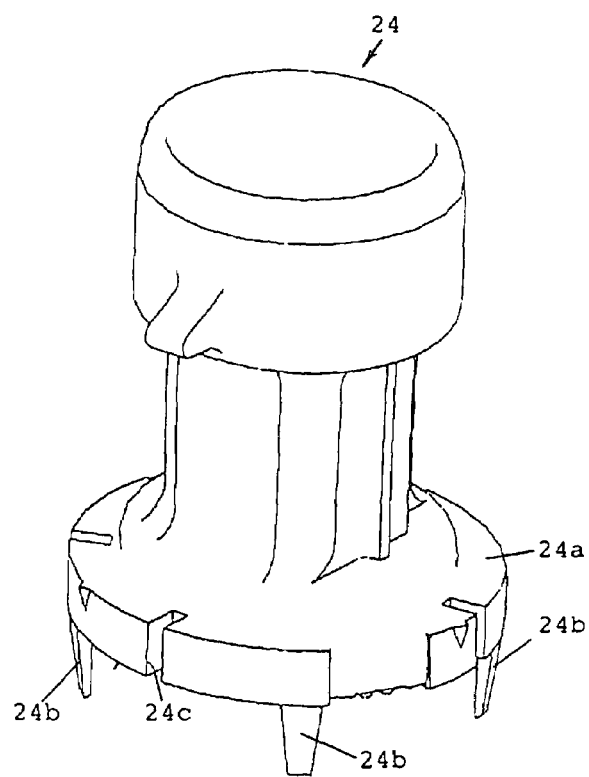
FIG. 4 is an enlarged perspective view of a connector member shown in FIG. 2.

Connector 24, as shown in FIG. 4, is generally similar in function and design to the connector member described in U.S. Pat. No. 6,272,927 incorporated herein by this reference and mentioned above. However, connector 24 in the present invention additionally has longitudinally, downwardly extending guide tab members 24b for properly positioning the sensor element 12 and conditioning electronics 14 during the crimping operation which completes the final assembly of the sensor. Further, connector 24 is formed with vent holes 24c positioned around the bottom base portion 24a to allow gas to escape from the internal part of the sensor during the crimping operation and curing of the adhesive material. Without such vent holes, the adhesive can develop a porous structure that can compromise the accuracy of the sensor.

Turning now to a second preferred embodiment shown in FIGS. 5–8, a hermetic pressure sensor 40 is particularly effective for use in applications in which it is desired to provide electrical isolation of the electronics from the metal hexport housing. For example, in certain applications, such as lighting strike induced voltages that travel along piping in which the sensor's hexport housing is connected, or an inverter driven electrical noise propagated along the piping, it is desired to provide such isolation.

Pressure sensor 40 has an open ended metal EMC shield 42 placed around the outer periphery of the capacitive pressure sensing element and crimped over onto the electronic circuit module disposed on the opposite face surface of the sensor element from the pressure responsive face surface. The capacitive pressure sensing element 12 and shield 42 received thereon are slidingly received in a generally cylindrical, tubular insulator 44 that has been placed in the pressure sensing element receiving chamber of the hexport housing thereby providing electrical insulation between the shield and the cylindrical side wall 16f of hexport housing 16. The material and thickness of the insulator is selected to isolate the sensing element from high voltage as well.

As in the first embodiment, an open space is provided between the sensing element and the metal diaphragm that is filed with suitable curable adhesive material, such as urethane 19 described in relation to the sensor 10 embodiment described above. The adhesive material is allowed to cure in situ to provide a relatively flexible material bonded to both the sensing element and the metal diaphragm.

More specifically, EMC shield 42 is in the form of a sleeve of suitable material, such as 304 stainless steel, having a generally cylindrical side wall 42a formed with a radially inwardly extending annular lip 42b at one end and with longitudinally extending (prior to crimping) opposed first and second crimp tabs 42c at the opposite end. The inside diameter of sleeve 42 is selected to closely receive the sensing element 12 of the transducer.

Signal conditioning electronics 14 is provided with two diametrically opposed electrical contact tabs 14a having a suitable high electrical conductivity surface material that extend radially outwardly from the substrate of the electronics and supported on the outer margin of the capacitor sensing element.

The pressure sensing element 12 is received inside the shield sleeve seated in engagement with lip 42b and tabs 42c are crimped into engagement with contact tabs 14a.

Insulator 44, of suitable electrically insulative material, such as PBT plastic, is formed in the shape of a sleeve having an inside diameter selected to closely receive shield 42 and having a radially, inwardly extending lip 44b at a first end thereof generally coextensive with lip 42b of the shield when installed in the insulator. A plurality of longitudinally extending recessed fluid flow passages or channels 44c are formed in the outer side wall 44a of the insulator spaced apart about its periphery and extending the full length of the insulator. Additionally, radially extending fluid flow passages or notches 44d are formed through wall 44a and lip 44b at the first end and in communication with respective channels 44c. Also, transitional, spacing crush tabs 44e extend longitudinally from the first end of the insulator and serve the same function as the lower tabs 21a of ring member 21, that is, the tabs that space the ring member above the surface of the metal diaphragm. Crush tabs 44e space shield sleeve 44 above metal diaphragm 18 through the initial phase of the crimping operation thus augmenting the flow of excess adhesive material from the open area to be discussed.

During assembly, insulator sleeve 44 is inserted into the chamber formed by cylindrical wall 16f. A selected amount of curable, adhesive, liquid material, such as the polyurethane material 19 used in the first embodiment discussed above, is dispensed into the bottom (lip end) of the insulator sleeve with the hexport housing 16 oriented in a vertical position as shown in FIG. 1. The shield mounted on the sensing element 12 is then inserted into the insulator sleeve and the attenuated wall at 16h of the hexport housing is crimped onto base 24a' of connector 24' thereby decreasing the volume and forcing excess adhesive liquid to flow out of the space defined by lips 42b, 44b, metal diaphragm 18 and sensing element 12. The material flows underneath the first end of insulator sleeve 44 between tabs 44e and through notches 44d and into channels 44c. Tabs 44e are crushed or flattened with the first end of the sleeve engaging the metal diaphragm and the remaining excess liquid is expressed through notches 44d. The device is then subjected to a heat soaking operation to cure the adhesive in situ forming layer 20 bonded to both the sensing element and metal diaphragm 18 allowing the sensor to effectively sense negative as well as positive pressure.

The space occupied by insulator 44 displaces air in the chamber of the housing, reducing it to a minimal amount. As a result, movement of connector 24' down into the chamber of the hexport housing does not result in significant air passing through channels 44c and notches 44d and into fluid 19 which otherwise could compromise the performance of the sensor. Thus, vent holes 24c in connector 24 of the sensor 10 embodiment are not needed and are not included in connector 24'. Also, guide tabs 24b of connector 24 are not used in the FIGS. 5–8 embodiment.

Description of hexport housing 16, metal diaphragm 18 and other components also used in the FIGS. 1–4 embodiment will not be repeated here but can be referred to above for details thereof.

Figure 5:
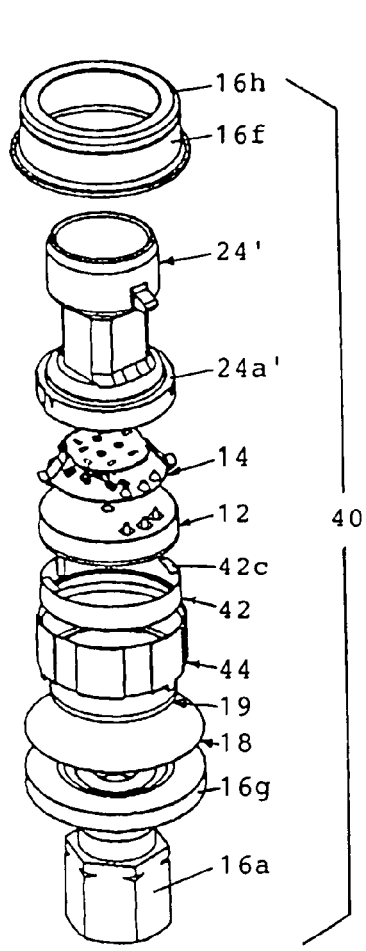
FIG. 5 is an exploded perspective view of a sensor made according to a second preferred embodiment of the invention.
Figure 6:
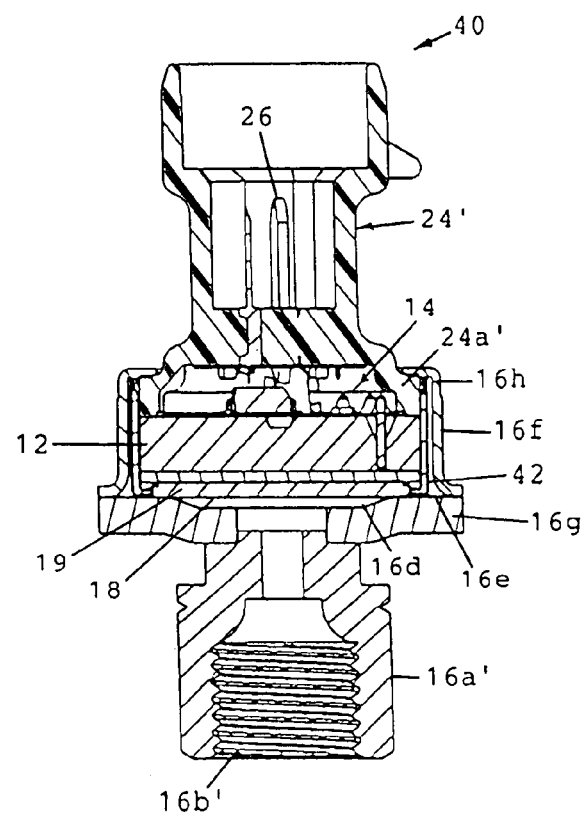
FIG. 6 is an elevational cross sectional view of the FIG. 5 sensor in the assembled condition taken through the longitudinal axis thereof.
Figure 6A:
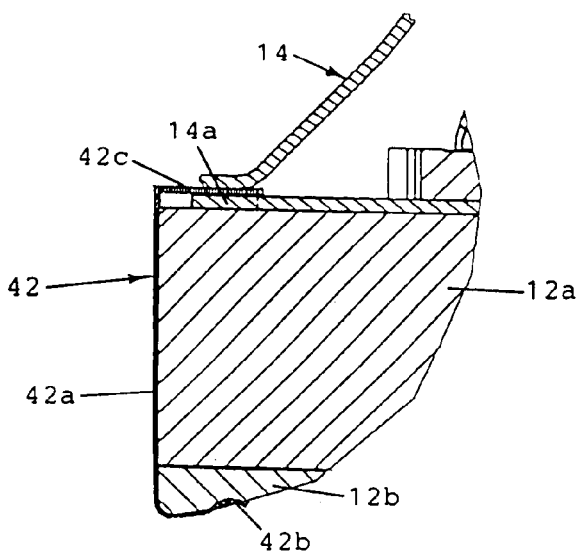
Figure 7:
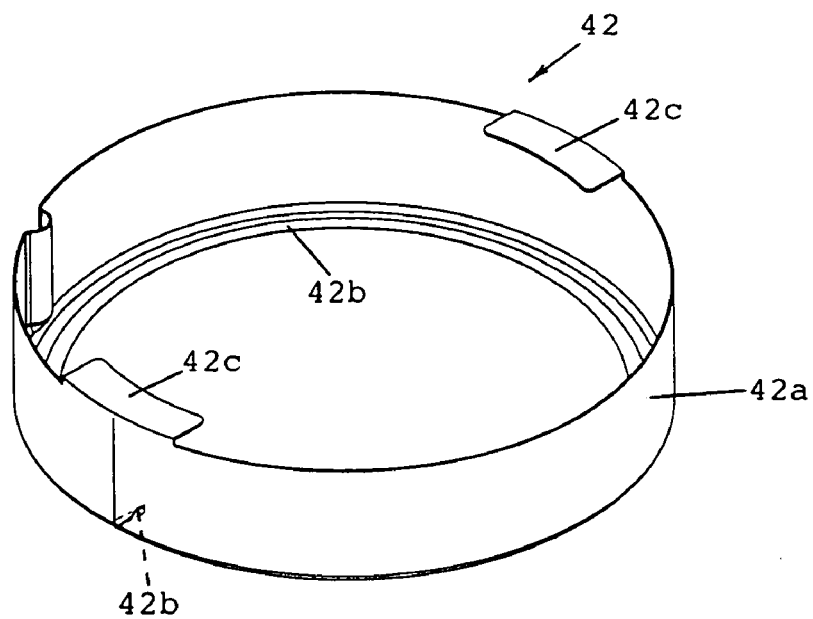
FIG. 7 is a perspective view of an EMC shield used in the FIG. 5 sensor.
Figure 8:
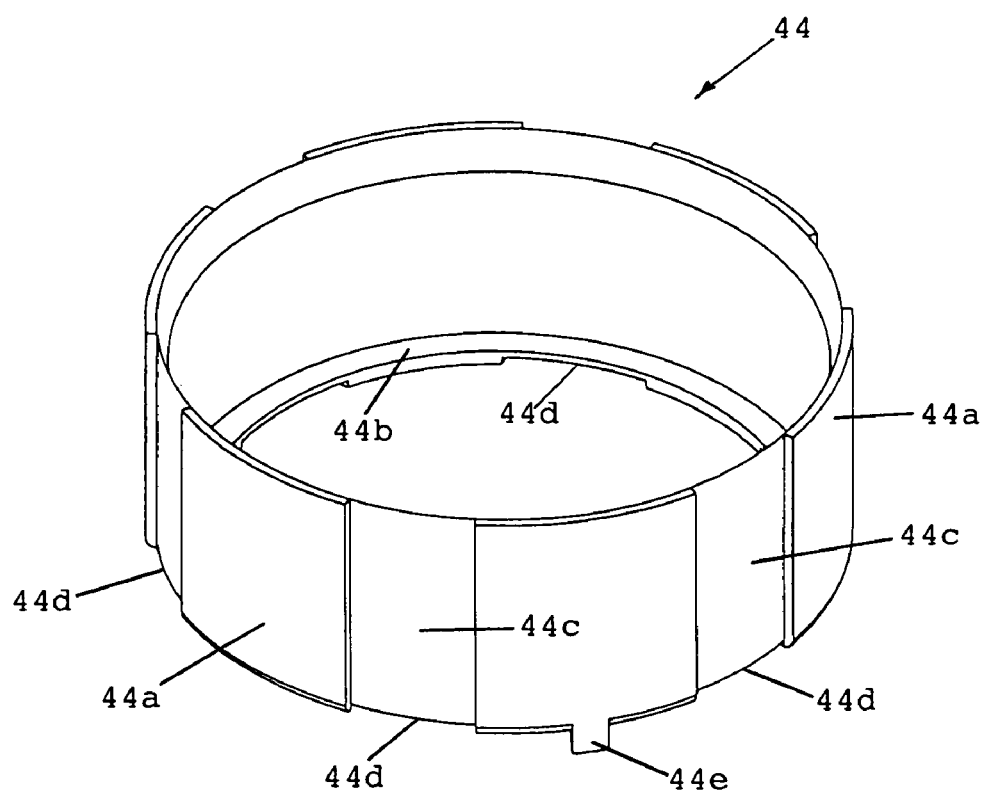
FIG. 8 is a perspective view of an insulator used in the FIG. 5 sensor.

It will be noted, however, alternative hexport housing structure is shown in FIGS. 5 and 6 with hexagonal flat surface 16a' of housing 16 extended generally to the lower end of the housing while the coupling threads 16b' are formed as female threads within fluid receiving passageway 16c, rather than as male threads as in the FIG. 1 embodiment.

It should be understood that although particular embodiments have been described by way of illustrating the invention, the invention includes all modifications and equivalents thereof that fall within the scope of the claims.

What is claimed:

1. In a fluid pressure sensor having a ceramic capacitive element with a pressure responsive surface, the method comprising the steps of forming a housing with a bottom wall having a recess, mounting a flexible metal diaphragm on the bottom wall over the recess in fluid sealed relation therewith, taking an element having a selected thickness to define an open area and having flow passages extending from within the open area to without the open area, placing the element in engagement with the metal diaphragm, dispensing a sufficient quantity of curable, flexible adhesive liquid resin into the open area to fill the space in the open area, inserting the ceramic capacitive element into the housing with the pressure responsive surface facing the bottom wall, moving the ceramic capacitive element into engagement with said element defining an open area to enclose the space defined by the element, the ceramic capacitive element and the metal diaphragm and displacing any excess liquid adhesive resin through the flow passages, and curing the adhesive resin in situ in the housing.

2. The method of claim 1 in which the curable, flexible adhesive resin is a polyurethane having a thermal coefficient and modulus of elasticity appropriately matching that of the ceramic capacitive element.

3. The method of claim 2 in which said element defining the open space is a ring shaped plastic member.

4. The method of claim 2 in which said element defining an open space is a circular lip of an insulator sleeve in series with a circular lip of an EMC shield sleeve in which the ceramic capacitive element is received and in turn is received in the insulator sleeve with both sleeves received in the chamber of the housing.

5. A fluid pressure sensor comprising a generally cylindrical capacitive pressure sensing element having a selected diameter and having a first pressure responsive surface and having transducer terminals disposed at a second opposite surface, a connector body having connector terminals therein, the connector formed with a recess therein, signal conditioning electronics disposed in the recess electrically connected to the transducer terminals and connector terminals for providing an electrical signal corresponding to the applied pressure, a housing having a pressure sensing element receiving chamber defined by a bottom wall and a cylindrical side wall extending upwardly from the bottom wall to a free end, the bottom wall formed with a fluid receiving recess, a fluid pressure port formed in the housing in communication with the recess, a thin, flexible metal diaphragm secured to the bottom wall and supported on a shoulder of the bottom wall circumscribing the recess in fluid sealing relation therewith, a ring having inside and outside diameters, the inside diameter being less than the selected diameter of the sensing element and having a selected thickness and formed with fluid passageways extending through the ring from the inside to the outside diameters thereof, the ring positioned on the metal diaphragm aligned with the shoulder of the bottom wall, the sensing element received in the sensing element receiving chamber engaged with the ring with the first surface facing the bottom wall and a layer of flexible, adhesive resin filing the space defined by the metal diaphragm, the sensing element and the ring and being bonded to the surfaces of the metal diaphragm and the sensing element and the free end of the housing side wall crimped over onto the body of the connector.

6. A fluid pressure sensor according to claim 5 further comprising longitudinally extending tabs extending upwardly from the ring to guide the position of the ring relative to the sensing element.

7. A fluid pressure sensor according to claim 5 further comprising transitional longitudinally extending tabs extending downwardly from the ring to space the ring above the surface of the metal diaphragm prior to the completion of the crimping procedure.

8. A fluid pressure sensor according to claim 5 in which vent holes are defined in the connector extending into the chamber of the housing to allow gas to escape during assembly and a curing procedure.

9. A fluid pressure sensor according to claim 5 further comprising guide tabs extending downwardly from the connector to position the sensing element and the signal conditioning electronics upon assembly.

10. A fluid pressure sensor comprising a generally cylindrical capacitive pressure sensing element having a selected diameter and having a first pressure responsive surface and having transducer terminals disposed at a second opposite surface, a connector body having connector terminals therein, the connector formed with a recess therein, signal conditioning electronics disposed in the recess electrically connected to the transducer terminals and connector terminals for providing an electrical signal corresponding to the applied pressure, a housing having a pressure sensing element receiving chamber defined by a bottom wall and a cylindrical side wall extending upwardly from the bottom wall to a free end, the bottom wall formed with a fluid receiving recess, a fluid pressure port formed in the housing in communication with the recess, a thin, flexible metal diaphragm secured to the bottom wall and supported on a shoulder of the bottom wall circumscribing the recess in fluid sealing relation therewith, a cylindrical EMC shield sleeve of suitable metallic material having first and second ends formed to closely receive the cylindrical pressure sensing element, the shield having a height to accommodate the pressure sensing element and having a radially inwardly extending lip at the first end for engagement with the sensing element, the shield having tabs extending from the second end for crimping engagement with selected portions of the signal conditioning electronics, a cylindrical insulator sleeve of electrically insulative material formed to closely receive the pressure sensing element and EMC shield mounted thereon, the insulator having one end formed with a radially inwardly extending lip adapted to engage the lip of the shield and being generally coextensive therewith, spaced apart longitudinally extending flow channels formed in the outside wall surface of the insulator, the pressure sensing element, the shield and the insulator disposed in the housing, the lip of the insulator engaging the metal diaphragm, the lips of the shield and the insulator defining an opening between the first surface of the pressure sensing element and the metal diaphragm and a cured adhesive resin filling the space in the opening and being bonded to the first surface of the pressure sensing element and the metal diaphragm.

11. A fluid pressure sensor according to claim 10 in which the cured adhesive resin is a polyurethane having a thermal coefficient and modulus of elasticity appropriately matching that of the pressure sensing element.

12. A fluid pressure sensor according to claim 11 in which the said one end of the insulator is formed with fluid flow notches through the wall of the insulator and in communication with respective longitudinally extending flow channels.

* * * * *